Figure 1:
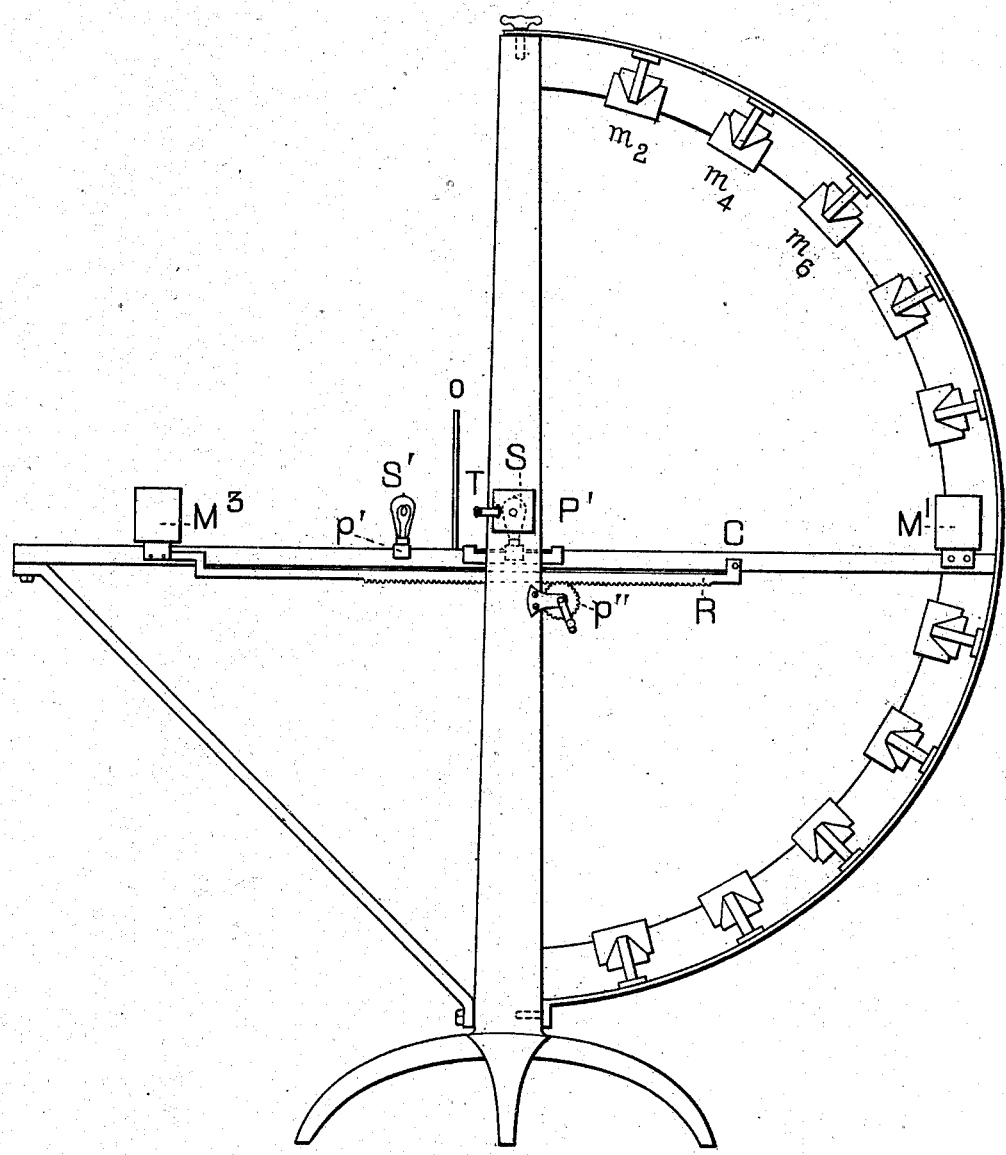

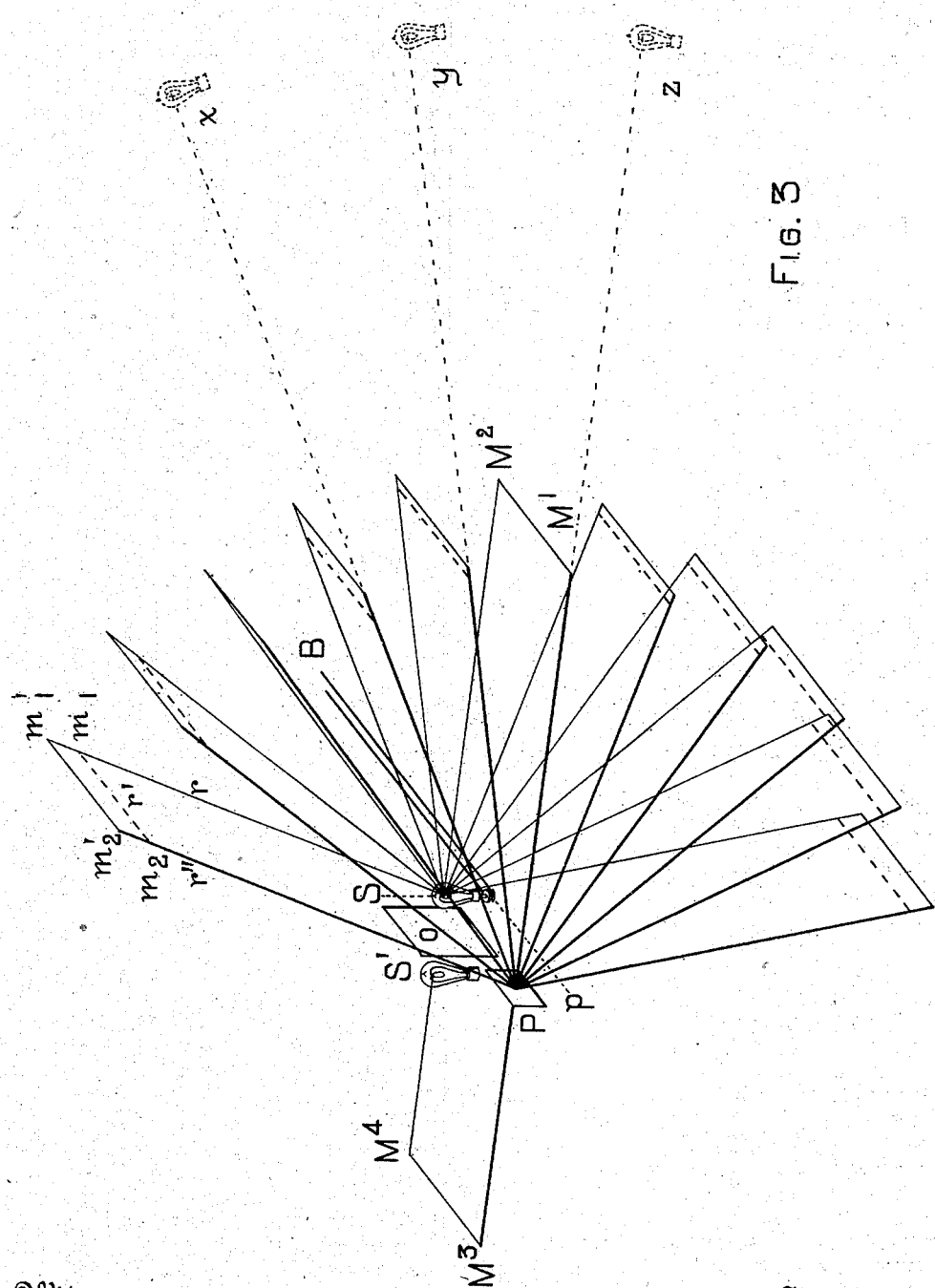

UNITED STATES PATENT OFFICE.

CHARLES PHILO MATTHEWS, OF LAFAYETTE, INDIANA, ASSIGNOR TO LOUIS B. MARKS, OF NEW YORK, N. Y.

PHOTOMETER.

SPECIFICATION forming part of Letters Patent No. 712,397, dated October 28, 1902.

Application filed March 24, 1902. Serial No. 99,743. (No model.)

*To all whom it may concern:*

Be it known that I, CHARLES PHILO MATTHEWS, a citizen of the United States of America, and a resident of Lafayette, in the county of Tippecanoe and State of Indiana, have invented certain new and useful Improvements in Photometers, of which the following is a specification.

My present invention relates in general to photometers, and in particular to an instrument adapted to indicate the mean spherical or mean hemispherical candle-power of the source of light without the necessity of prolonged calculations or measurements. The object, in fact, is to do away with all computations and to render with a single setting the mean spherical or hemispherical candle-power of the illumination.

Therefore the object of the invention is to save time and labor in arriving at the result named above. Incidentally the device is adapted also to indicate the candle-power in linear direction, as in ordinary photometers, and without altering the construction. Only some small adjustments are necessary for changing the apparatus from one type of photometer to the other.

By a slight manipulation my invention is adapted to the direct measurement of the reduction-factor or the ratio of the mean spherical candle-power to the mean horizontal candle-power.

Without setting forth the exact novelty of the invention, which is attended to in the claims, I may state generally that the nature of the organization comprising the invention consists in a series of mirrors so arranged in accordance with mathematical and scientific principles of light as to illuminate one side of a screen proportionally to the mean spherical or hemispherical candle-power of the source to be tested, said source of light preferably being rapidly rotated or spun on its axis. The other side of the screen is illuminated by rays reflected from mirrors, which receive light from the standard source only, an opaque screen being located between the two sources of light. In principle it is immaterial whether the standard light or the last-named mirrors are moved until the illumination of the photometer-screen on the respective sides is balanced; but the particular construction illustrated herein is based upon the adjustability of said mirrors. The aforementioned mirrors in a series are arranged circularly, according to a certain law, and after once being adjusted remain fixed for all ordinary intensities of light adapted to be measured by a given size of apparatus. The rays from the spinning lamp—as, for example, an incandescent electric lamp and radiating in the plane of the axis of rotation—are directed by mirrors arranged in a semicircle around the center of the source of light, and the reflected rays are finally brought all upon one side of a photometer-screen. Another result of the arrangement of mirrors is the reduction of the intensity of each ray or pencil in the ratio of the cosine of the angle to the normal to one. The ray incident upon the photometer-screen at a certain angle to the normal is reduced in candle-power approximately in the ratio of the cosine of that angle to one. Inasmuch as this cosine law is not exact the mirrors are so disposed as to compensate for the difference, and this is accomplished by adjusting and then fixing the mirrors nearer the screen than if the cosine law were exact.

More generally stated, my invention is for measuring the mean spherical or hemispherical candle-power; and it consists of a fixed standard light, a support for a fixed source of light to be tested and cut off from the standard light as to illumination, a fixed photometer-screen cut off from said lights as to direct illumination, devices movable to and from said screen in the path of the rays of light radiated from said standard light and directed upon one side of said screen, and devices like the above-named devices, only fixed, located in the path of the rays radiated from said source and directed to the other side of said screen and located, respectively, at different angles with regard to the normal of said screen and at predetermined distances therefrom.

My invention consists also of a photometer-screen, a fixed standard light, a support for a fixed source of light to be tested, an opaque screen between the two lights, and relatively movable mirrors for throwing the light from the respective sources upon the photometer-screen.

All the details of my apparatus in so far as my invention is concerned are set forth in the accompanying drawings.

Figure 2:
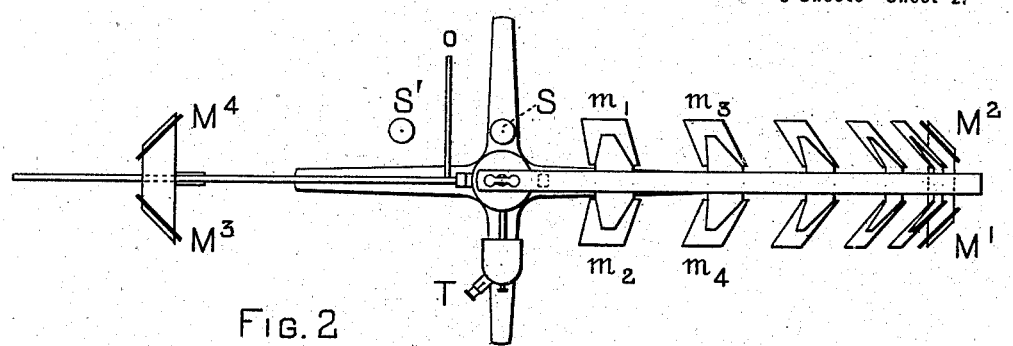
Figure 4:
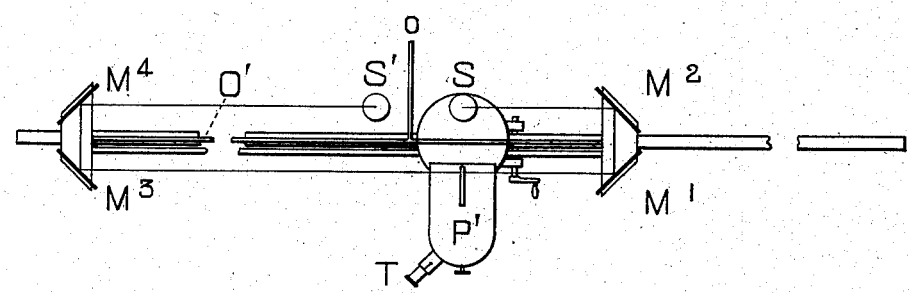
Figure 5:
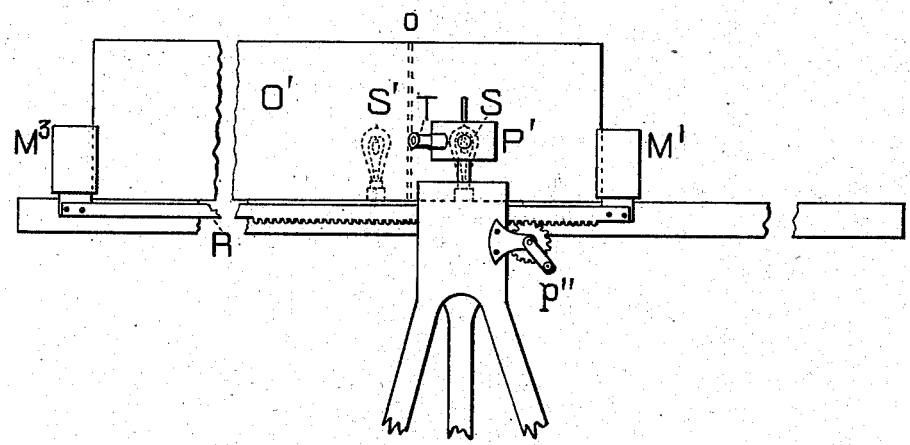

Figure 1 is a side elevation of the whole apparatus in outline. It may be considered as a diagram, as the exact mechanical construction in all its details is immaterial to the invention. Fig. 2 is a plan of substantially all that is shown in Fig. 1. Fig. 3 is intended to be a diagram to show especially the paths of the rays of light and so many of the mechanical elements as are necessary for tracing the rays. The view is perspective. Fig. 4 is a plan of that portion of the apparatus which serves for horizontal measurements of candle-power. Fig. 5 is a side elevation of what is shown in Fig. 4.

The apparatus consists of the combination of a photometer-screen P standing in a vertical plane, a source of light S to be tested on a support or pulley $p$, with its center in an extension of said plane and on the same level as the central portion of said screen, a standard light S' back of said source on a support $p'$ and separated by an opaque screen $o$ from the light S and located on the same level with said light and with said photometer-screen, a pulley $p$ and belt B, by which the light S may be spun, a fixed photometer P', in which is located the photometer-screen P and which is provided with a telescopic eyepiece T (which, however, is not an element of the invention) for viewing the screen, a bar R, provided with a pinion $p''$ for feeding the bar to and fro in a direction perpendicular to the plane of the screen and centrally located between the light S and the photometer-screen P, a pair of mirrors $M^3$ $M^4$, carried at the left-hand end of the bar, a pair of mirrors M' and $M^2$, carried at but removable from the right-hand end of the bar R, the mirrors being all of the same reflecting-power and suitably cut from one piece of glass for eliminating the coefficient of absorption of the mirror, the planes of the mirrors being vertical and each mirror standing at forty-five degrees to an opaque screen O', which stands vertical above the bar R, midway between the central portion of the photometer-screen and the light S and perpendicular to the plane of the photometer-screen, the mirrors M', $M^2$, $M^3$, and $M^4$ all being at the same level with one another, the arrangement being such that a ray from the light S will be reflected at forty-five degrees from the mirror $M^2$, then at forty-five degrees from the mirror M', and will then strike the photometer-screen at a right angle and so that a ray from the standard S will travel in a similar manner with respect to the mirrors $M^4$ and $M^3$ perpendicularly to the photometer P'. Pairs of mirrors $m'$ $m^2$ and $m^3$ $m^4$, &c., similar to the pair M' $M^2$, except that the former pairs are located at equal intervals of fifteen degrees around a semicircle both above and below the pair M' and $M^2$, the mirrors of each pair standing at right angles to each other and each mirror of each pair standing at an angle of forty-five degrees to a vertical plane and on opposite sides thereof, and all the pairs, eleven in number, except the pair $M^3$ $M^4$, being at the right of the photometer-screen P, the distances of the pairs which are in the semicircle from the center of the circle being derived and determined from calculation, once for all, from the cosine law, and then set in toward the center to correct the inaccuracy of said law.

In the diagram in Fig. 3 lines represent rays and points represent mirrors. For example, $m'$ $m^2$ are the mirrors or the central points of the mirrors. $m'$ 1 $m'$ 2 illustrates the positions of the mirrors as determined by an application of the cosine law. $m'$ and $m^2$ show that these mirrors have been moved equally toward the center in order to secure the right position, and so with the other pairs, which are all moved to and then fixed at locations near the center of the circle.

The terms "horizontal," "vertical," "level," &c., of course are only relative and used for convenience in explaining what is shown in the drawings; but the whole apparatus may be turned upside down or at any angle, so that nothing need necessarily be vertical or horizontal.

Experiment and calculation show that eleven pairs of mirrors at intervals of fifteen degrees are sufficient to insure an accuracy within .6 per cent., the effect being as if there were eleven sources of light arranged in the position where the images would seem to be if the mirrors were looked into by an observer at the photometer-screen P. Some of the images are indicated at $x$ $y$ $z$. More mirrors would insure greater accuracy; but .6 per cent. is within the limits of observational error, and hence a greater number is unnecessary.

The operation for obtaining the mean spherical candle-power consists of the following steps: In this case the pair of mirrors M' $M^2$ is placed in the same circle, as shown in Figs. 1, 2, and 3, and is therefore not movable with the bar R. They become a part of the fixed series of twenty-two mirrors. They remain fixed, and so do the others in the semicircle, during the whole operation of measuring lights of the same or different candle-powers, provided the mean spherical candle-powers are to be determined. If the operator should place his eye in a position of the photometer-screen P, he would see eleven images, and each image would shed light upon the photometer-screen at an angle determined by the elevation or depression of the mirrors to which such image is due, this inclined incidence of the light and the apparent distance of the images producing together the required reduction in the illumination, so that the total illumination of one side of photometer-screen is proportional to the mean spherical intensity of the source to be tested. The next step consists in turning the pinion $p''$ until the mirrors $M^3$ and $M^4$ reflect enough light from the standard S' to balance the illumination of the screen. If a stronger source of light is to be tested, the pair of mirrors $M^3 M^4$ would, on the principle of inverse squares, have to be moved nearer the photometer-screen. In order to measure the mean hemispherical intensity of the source either above or below a horizontal plane, it suffices to omit the mirrors, respectively, below or above the horizontal plane. The operation is then precisely the same as that of obtaining the mean spherical intensity. In order to employ the instrument for linear candle-power, omit all the mirrors except the horizontal ones with opaque screens, remove the pair M' and $M^2$ and place it upon the right-hand end of the bar R and C, and then move the bar in one direction or the other, as the case requires, until the illumination on one side of the screen counterbalances that on the other side.

My invention is broad enough for permitting a variation in the number of mirrors employed or any other change covered by the claims.

My apparatus may also serve for the direct measurement of the mean spherical reduction factor or the mean spherical candle-power divided by the mean horizontal candle-power. Remove the opaque screen o and the standard lamp. Now the right-hand side of the screen is illuminated proportionally to the mean spherical candle-power of the single source of light, or, in other words, the mean spherical candle-power is measured against the mean horizontal candle-power, and hence the mean spherical reduction factor becomes known directly.

The lamp S may be rotated by means of the belt B. The object of rotating the lamp is for radiating the same average of light to the mirrors which are arranged in the circle, the lamp consisting usually of a filament, which is apt to radiate more light in one direction than in another.

I claim as my invention—

1. Apparatus for measuring candle-power, consisting of the combination of a photometer-screen, supports for sources of light, and different devices for receiving and directing the light from the sources to said screen in a predetermined manner, one of said devices being movable to and fro with respect to both said screen and said lights.

2. Apparatus for measuring candle-power, consisting of the combination of a photometer-screen, a standard light, a support for a source of light to be tested, an opaque screen between the two lights, and two pairs of mirrors for throwing the light from the respective sources upon said photometer-screen, one pair of mirrors and screens being relatively movable for illuminating the photometer-screen in a predetermined manner, one pair of mirrors serving to reflect the rays from one light to said photometer-screen, and the other pair serving to reflect the rays from the other light to said photometer-screen.

3. Apparatus for measuring candle-power, consisting of the combination of a photometer-screen, a fixed standard light, a support for a fixed source of light to be tested, an opaque screen between the two lights, a pair of mirrors for receiving and reflecting the light from the standard to said screen, and movable to and fro with respect to said screen, and another pair of fixed mirrors for receiving and reflecting the light from said source to be tested, to said screen.

4. Apparatus for measuring candle-power, consisting of the combination of a photometer-screen, supports for sources of light, means for receiving and directing the light from the sources to opposite sides of said screen, and a device for causing a relative displacement of said means from said photometer-screen, a portion of said means consisting of pairs of mirrors in the path of the rays from one of said sources, and the remainder of said means consisting of a single pair of mirrors in the path of the rays from the other source of light.

5. Apparatus for measuring candle-power, consisting of the combination of supports for sources of light cut off from each other as to mutual illumination, a photometer-screen cut off from said lights as to direct illumination, devices located at a distance from said lights and from said screen for receiving the rays and returning the same to opposite sides of said screen, and a bar connecting said devices and movable to and fro, for varying the distances between said screen and the respective devices.

6. Apparatus for measuring candle-power, consisting of the combination of supports for sources of rays of light cut off from each other as to mutual illumination, a photometer-screen cut off from said lights as to direct illumination, devices located at a distance from said lights and from said screen for receiving the rays and returning the same to opposite sides of said screen, a bar connecting said devices and movable to and fro, for varying the distance between said screen and the respective devices, and mechanism for moving said bar.

7. Apparatus for measuring candle-power, consisting of the combination of supports for fixed sources of light cut off from each other as to mutual illumination, a photometer-screen cut off from said lights as to direct illumination, mirrors located at a distance from said lights and from said screen for receiving the rays and reflecting the same to opposite sides of said screen, and means for varying the respective distances between said screen and said mirrors.

8. Apparatus for measuring candle-power, consisting of the combination of supports for fixed sources of light cut off from each other as to mutual illumination, a fixed photometer-screen cut off from the lights as to direct illumination, mirrors in pairs located at a distance from said lights and from said screen and on opposite sides thereof and standing individually at forty-five degrees to the plane of said screen and to the direction of said mirrors, and means for moving either pair nearer to and simultaneously the other pair of mirrors farther from said screen in a perpendicular direction to said screen.

9. Apparatus for measuring candle-power, consisting of the combination of supports for fixed sources of light cut off from each other as to mutual illumination, a fixed photometer-screen cut off from said lights as to direct illumination, a pair of mirrors on one side of the screen, movable to and from the screen, individually standing at forty-five degrees to the plane of said screen and located in the path of the ray of light from one of said sources to one side of said screen, and fixed pairs of mirrors arranged in series in a semicircle approximately and located in the path of the rays from the other source to the other side of said screen, and located at predetermined distances from said screen, the axis of said circle being in a line lying in the plane of said screen and passing through the center of the last-named source of light.

10. Apparatus for measuring candle-power, consisting of the combination of a fixed standard light, a support for a fixed source of light to be tested cut off from the standard light as to illumination, a fixed photometer-screen cut off from said lights as to direct illumination, movable mirrors in the path of the rays of light emanating from said standard light and reflected upon one side of said screen, and fixed mirrors located in the paths of rays of light radiated from said source and reflected to the other side of said screen, and located respectively at different angles with regard to the normal of said screen and at predetermined distances from said screen.

11. Apparatus for measuring candle-power, consisting of the combination of a fixed standard light, a support for a fixed source of light to be tested and cut off from the standard light as to illumination, a fixed photometer-screen cut off from said lights as to direct illumination, devices movable to and from said screen in the path of the rays of light radiated from said standard light and directed upon one side of said screen, and devices like the above-named devices, only fixed, located in the path of the rays radiated from said source and directed to the other side of said screen, and located respectively at different angles with regard to the normal of said screen, and at predetermined distances therefrom.

12. Apparatus for measuring candle-power, consisting of the combination of a fixed standard light, a support for a fixed source of light to be tested cut off from the standard as to illumination, a fixed photometer-screen cut off from said lights as to direct illumination, a movable device for receiving light from said standard and directing it upon one side of said screen, and other devices like the first-named, located at intervals in a circle approximately drawn about the screen with a predetermined radius, for respectively receiving different rays from said source, and directing them to the other side of said screen.

13. Apparatus for measuring candle-power, consisting of the combination of a fixed standard light, a support for a fixed source of light to be tested cut off from the standard as to illumination, a fixed photometer-screen cut off from said lights as to direct illumination, a movable reflecting medium for receiving rays from said standard and directing them upon one side of said screen, and other reflecting mediums located at equal intervals circularly approximately at predetermined distances from said screen, for respectively receiving different rays from said source and reflecting them to the other side of said screen.

14. Apparatus for measuring candle-power, consisting of the combination of a standard light, a spinning support for a source of light to be tested cut off from the standard as to illumination, a photometer-screen cut off from said lights as to direct illumination, a reflecting medium for receiving rays from said standard and directing them upon one side of said screen, and other reflecting mediums at predetermined distances from said screen, for respectively receiving different rays from said source and reflecting them to the other side of said screen, and means for causing a balance of the illuminations on the two sides of said screen.

15. In an apparatus for measuring candle-power, the combination with the support for the light to be tested, of a photometer-screen, and mirrors so fixed, as to illuminate said screen proportionally to the mean spherical candle-power of said light, said mirrors remaining stationary during the operation of measuring the light.

16. In an apparatus for measuring candle-power, the combination with the support for the light to be tested, of a photometer-screen, and devices so fixed, as to illuminate said screen proportionally to the mean spherical candle-power of said light.

17. In an apparatus for measuring candle-power, the combination of a support for the source of light to be tested, a photometer-screen cut off from said source as to direct illumination, movable mirrors in the path of the rays of light radiated from one side of said light and reflected from said mirrors upon one side of said screen, and fixed mirrors located in the paths of the rays of light radiated from the other side of said source, and reflected by said fixed mirrors upon the other side of said screen, and located angularly about said source and said screen.

18. Apparatus for measuring candle-power, consisting of the combination of a support for a fixed source of light, a fixed photometer-screen cut off from said light as to direct illumination, a pair of mirrors on one side of the screen, movable to and from the screen, individually standing at forty-five degrees to the plane of said screen and located in the path of the ray of light from said source to one side of said screen, and fixed pairs of mirrors arranged in series in a semicircle approximately and located in the path of the rays from the source to the other side of said screen, and located at predetermined distances from said screen, the axis of said circle being in a line lying in the plane of said screen and passing through the center of the source of light.

19. Apparatus for measuring candle-power, consisting of the combination of a support for a fixed source of light to be tested, a fixed photometer-screen cut off from said light as to direct illumination, a movable device for receiving light from said source and directing it upon one side of said screen, and other devices like the first named, located at intervals in a circle approximately drawn about the screen with a predetermined radius, for respectively receiving different rays from said source, and directing them to the other side of said screen.

20. Apparatus for measuring candle-power, consisting of the combination of a support for a fixed source of light to be tested, a fixed photometer-screen cut off from said light as to direct illumination, devices movable to and from said screen in the path of the rays of light radiated from said source of light and directed upon one side of said screen, and devices like the above-named devices, only fixed, located in the path of the rays radiated from said source and directed to the other side of said screen, and located respectively at different angles with regard to the normal of said screen, and at predetermined distances therefrom.

21. Apparatus for measuring candle-power, consisting of the combination of a support for a fixed source of light to be tested, a fixed photometer-screen cut off from said light as to direct illumination, a movable reflecting medium for receiving rays from said source and directing them upon one side of said screen, and other reflecting mediums located at equal intervals circularly approximately at predetermined distances from said screen, for respectively receiving different rays from said source and reflecting them to the other side of said screen.

22. Apparatus for measuring candle-power, consisting of the combination of a spinning support for a source of light to be tested, a photometer-screen cut off from said light as to direct illumination, a reflecting medium for receiving rays from said source and directing them upon one side of said screen, and other reflecting mediums arranged in a curved path around and at predetermined distances from said screen, for respectively receiving different rays from said source and reflecting them to the other side of said screen, and means for causing a balance of the illumination on the two sides of said screen.

23. In apparatus for measuring candle-power, the combination with the support for the source of light to be tested, of a photometer-screen, and devices so located as to illuminate one side of said screen proportionally to the mean spherical candle-power, and the other side proportionally to the mean horizontal candle-power, for the purpose as set forth, of the direct measurement of the mean spherical reduction factor.

Signed this 18th day of March, 1902.

CHARLES PHILO MATTHEWS. [L. S.]

Witnesses:
J. W. McCREA,
C. C. PYKE.